UNITED STATES PATENT OFFICE.

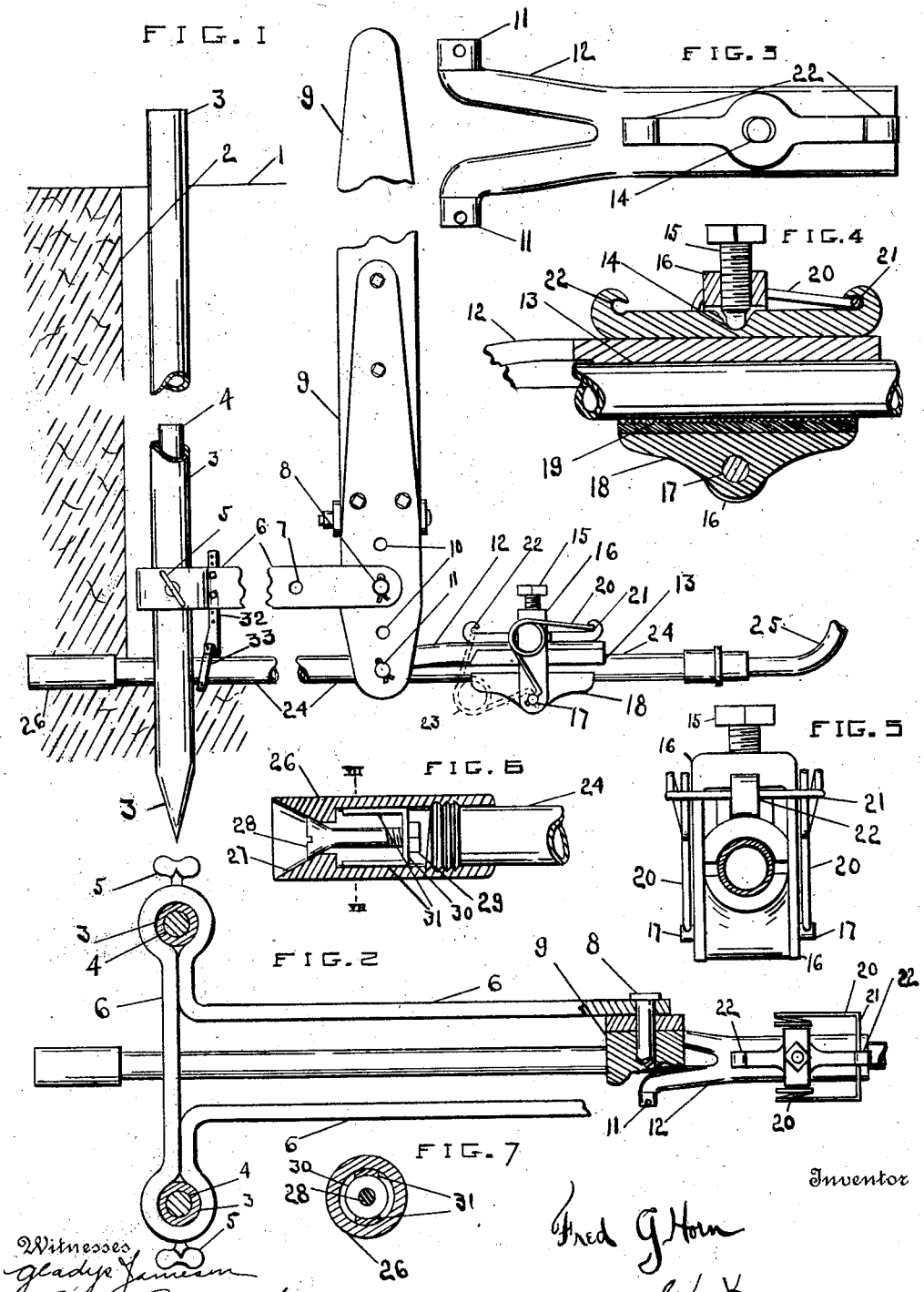

FREDERICK G. HORN, OF TOLEDO, OHIO.

PIPE-ACTUATOR.

1,047,942. Specification of Letters Patent. Patented Dec. 24, 1912.

Application filed October 10, 1910. Serial No. 586,216.

*To all whom it may concern:*

Be it known that I, FREDERICK G. HORN, a citizen of the United States, residing at Toledo, Lucas county, Ohio, have invented a new and useful Pipe-Actuator, of which the following is a specification.

This invention relates to member actuating mechanism, more particularly as adapted to automatically engaging or gripping the member as it is caused to progress.

This invention has utility when embodied in devices for actuating by either driving or pulling a member through material, having especial value in laying pipe or conduits under pavements and sidewalks, thereby avoiding all unnecessary excavation. For instance, the pipe may be driven from the cellar to the street main, and street main excavation alone is necessary to complete the connection.

Referring to the drawings: Figure 1 shows an embodiment of the invention as adapted to a pipe actuator; Fig. 2 is a plan view thereof with parts broken away; Fig. 3 is a detail view in plan of a link extending from the actuator to coact with the actuated member; Fig. 4 is a section of the member gripping elements of the device; Fig. 5 is an end view of these gripping elements showing the gripped member in section; Fig. 6 is a longitudinal sectional view of the flushing nozzle; and Fig. 7 is a transverse section thereof on the line VII—VII of Fig. 6.

In the excavation 1, near the end 2 thereof where it is desired to operate, the machine may be locked or fixed in position to permit operation, say by the anchor posts 3 driven into the bottom of the excavation. The lower portions of these pointed hollow posts are reinforced by the rods 4 to more surely resist the work action. Carried by the pair of posts and maintained in position thereon by the set screws 5 is the forked fulcrum bracket 6 which may be adjusted to various positions as desired for operation. This fulcrum bracket 6, besides being adjustable on the posts 3 by the set screws 5, has fulcrum pivot holes 7 which may receive the fulcrum pin 8 to carry the first class lever 9 shown as of a dimension to permit operation with considerable mechanical advantage. This mechanical advantage may be varied by placing the fulcrum pin 8 in different holes 10 in the lever 9, or by various shifting of the pivot arms 11 into the various holes 10, which pivot arms carry the link 12 having an extended gripping element portion 13. This link 12 opposite the gripping element 13 is provided with a concave side 14 with which rockably coacts the bolt 15 to adjustably mount the yoke link 16 having pivot pin 17 to carry the opposing gripping element 18 shown as provided with the toothed portion 19. As a setting device for this grip, yieldable means or spring 20 engages with pivot pin 17 serving the additional function of maintaining this pin in position. This spring 20 is astride the gripping means comprising the elements 13, 18, as well as astride the forked link 16. The medial portion 21 of this spring 20 may engage in a hook or keep 22 of the link 12 as shown in full lines in Fig. 1. So connected up this setting device tends to throw the gripping element 18 toward the lever 9 so that when the lever is actuated to push this shoe or gripping element 18, the gripping action will occur, while the reciprocation of lever 9 in the opposite direction will result in releasing of this gripping element. This means that the clutching will occur in but one direction of the lever operation, which operation is shown in Fig. 1 as pipe withdrawing position. To reverse the action of this setting device, it may be slipped over to the dotted line position 23 shown in Fig. 1, or be re-set in the pin 17 to be oppositely disposed to the position shown in full lines in Fig. 1. When the spring 20 engages the hook 22 nearer the lever 9 there is a tendency to force the shoe or gripping element 18 away from the lever 9 in the swing of this element 18 upon the link 16 so that when the lever 9 is actuated to pull the element 12, a gripping will occur, while the reverse or pushing of element 12 away from lever 9 will unclutch or free the member to be actuated thereby. Each reciprocation produces a re-setting to reëngage the member 24 as it progresses.

To adapt the device for various sizes of rods, pipes or other means to be driven, the set screw or bolt 15 may be adjusted to vary the position of the shoe or toothed gripping element 18 as to the smooth face gripping element 13. In practice the curvature of these gripping elements may be such as to conform to the mean size of said pipe to be handled, and thus be of a dimension to properly handle two or three sizes larger or smaller.

In driving hollow members, say as pipe, in many instances the resistance of the earth may be reduced by a combined flushing operation, this being especially true in the intermittent action of the lever machine herein disclosed. There is accordingly shown connected up to the pipe 24, the hose 25 from a source of water supply, while the embedded end of the pipe 24 is provided with a flushing nozzle 26 shown as having the hollow cone end 27 in which is fitted the adjustable taper head bolt 28 with the nut 29 thereon to coact with the yoke 30 having the legs 31. This yoke and its legs while maintaining the bolt centered, allow passage of the water through the jetting spray from between the head of bolt 28 and the cone 27 of the flushing nozzle when the bolt is in its forward position as limited by the legs 31. As material is jammed into the end of this nozzle, the bolt 28 sets to prevent clogging. When the actuating pressure is released, the water will remove this material from the head of the nozzle and by seeping through the soil allow of more easy operation. In some instances the soil may be moist enough to not require this flushing, while in other instances operation may be effective even without moisture. When there is water to contend with, this device is of exceptional value owing to the fact that the parts to be adjusted and the working parts are disposed above the line of the actuating member. This means there is a minimum of trouble from water in the ditch or cellar, and that whatever excavation is made need not be any greater depth than the pipe to be laid because the machine may drive the pipe right along the bottom of the gutter. The gutter itself serves to aid in guiding the pipe whenever such guiding may be desirable. In the event of meeting an obstruction in the soil, or in removing pipe already laid, the pipe may be withdrawn with the mechanism in the position shown in Fig. 1, full lines, while for driving the pipe the setting device is drawn to the position shown in dotted lines 23, Fig. 1.

The various adjustments permit of the use of the lever other than first class when such might be desired. The disposal of link 12 is such that the line of pull from the lever approximates the effective line of actuation of the driven or pulled member, thereby insuring maximum of efficiency in operation. The extended surface of contact of the gripping elements insures positive engagement of the member driven and notwithstanding the extension of the gripping surfaces is such as to eliminate possibility of crushing the pipe or even fracturing the galvanizing.

When using this machine, especially with the posts anchoring it in more or less soft soil, the great power of the machine tends to loosen the posts which rock upon the driving and recover strokes to thereby shorten the effective pull length, and still further loosen the anchor. To eliminate this trouble in many instances it will be found desirable to mount upon the fulcrum bracket 6, adjacent the anchor posts 3, a recover gripping means. This recover gripping means is shown in Fig. 1 as embodying the stem 32 adjustably carried by the bracket 6 to permit of proper gaging of the distance from pipe 24. This stem 32 is shown as pivotally carrying the grip ring 33 so that when the lever 9 is on its recover stroke, this grip will lock with the pipe 24 to hold the bracket, and thus throw the driving grip 13, 19, the full stroke distance for reëngagement. In any instance where it is desired to mount the machine along a pipe or other member without slipping the grips over the end of the pipe, the grip of form 32, 33 may be eliminated and a grip say of type 13, 19 adopted.

What is claimed and it is desired to secure by Letters Patent is:

1. A pipe actuator comprising a pair of vertically disposed anchor posts, a horizontally disposed bracket sleeved upon, carried by and projecting from said posts, a vertically extending pipe actuating lever mounted on the bracket, and connecting means from the lever to horizontally actuate a pipe below the bracket and between the posts.

2. The combination with a driving and pulling machine lever, an anchor mounting therefor against movement in either direction, of a first link pivotally connected thereto and provided with a gripping element, a second link pivotally connected to the first link, and a reversible gripping element carried by the second link.

3. The combination with a pair of anchor posts, of a fulcrum bracket sleeved upon said posts for adjustment therealong, and a lever mounted on the bracket and provided with intermittent gripping means for engaging and disengaging a member to be actuated.

4. The combination with a vertical anchor, of a fulcrum bracket carried thereby, means for vertically adjusting the position of the bracket along the anchor, means for adjusting the position of the fulcrum of the bracket independently of the carrying of the bracket by the anchor, and a lever mounted on the bracket fulcrum and provided with member gripping means.

5. The combination with an anchored inintermittent driving machine embodying a bracket and a lever carried by the bracket, of driving gripping means connected to the lever and a recover gripping means connected to the bracket.

6. The combination with an intermittent driving machine provided with anchor posts, of a driving gripping means for actuating a member, and a recover gripping means coacting with the actuated member to relieve the posts.

7. An actuating mounting, a first gripping element through which the gripped load is directly carried from the mounting, an opposing relatively freely swingable second gripping element, and a member pivoted to one of the gripping elements and having a rockable set screw connection with the other element adjustable to vary the distance between the gripping elements and providing the swinging and only mounting for the second gripping element, whereby the second gripping element may swing toward the first gripping element to effect gripping action.

8. The combination with a pair of opposing tiltable gripping elements of reversible yieldable setting means coacting between the elements and provided with two mountings, said means tilting the gripping elements in one position of its mounting for gripping in one direction and in the other position of its mounting for gripping in the other direction.

In testimony whereof I affix my signature in the presence of two witnesses.

FRED. G. HORN.

Witnesses:
GEO. E. KIRK,
C. H. RAUCH.

Copies of this patent may be obtained for five cents each, by addressing the "Commissioner of Patents, Washington, D. C."